US012354152B2

(12) United States Patent
Ramakrishnan et al.

(10) Patent No.: US 12,354,152 B2
(45) Date of Patent: *Jul. 8, 2025

(54) AUTOMATED PRODUCT RECOMMENDATION

(71) Applicant: Fiserv, Inc., Brookfield, WI (US)

(72) Inventors: Shreegopal Ramakrishnan, London (GB); Okan Ozaltin, London (GB)

(73) Assignee: FISERV, INC., Milwaukee, WI (US)

( * ) Notice: Subject to any disclaimer, the term of this patent is extended or adjusted under 35 U.S.C. 154(b) by 367 days.

This patent is subject to a terminal disclaimer.

(21) Appl. No.: 18/159,292

(22) Filed: Jan. 25, 2023

(65) Prior Publication Data
US 2023/0169573 A1    Jun. 1, 2023

Related U.S. Application Data

(63) Continuation of application No. 17/081,687, filed on Oct. 27, 2020, now Pat. No. 11,593,861.

(60) Provisional application No. 62/926,988, filed on Oct. 28, 2019.

(51) Int. Cl.
*G06Q 30/00* (2023.01)
*G06N 20/00* (2019.01)
*G06Q 30/0601* (2023.01)

(52) U.S. Cl.
CPC ......... *G06Q 30/0631* (2013.01); *G06N 20/00* (2019.01); *G06Q 30/0633* (2013.01)

(58) Field of Classification Search
CPC .......... G06Q 30/0601; G06Q 30/0613; G06Q 30/0623; G06Q 30/0629; G06Q 30/0631
See application file for complete search history.

(56) References Cited

U.S. PATENT DOCUMENTS

| 7,987,188 B2 * | 7/2011 | Neylon ................. G06F 16/313 |
| | | 706/45 |
| 8,386,336 B1 * | 2/2013 | Fox .................... G06Q 30/0631 |
| | | 705/26.7 |
| 8,417,713 B1 * | 4/2013 | Blair-Goldensohn ...................... |
| | | G06F 16/9535 |
| | | 705/347 |

(Continued)

OTHER PUBLICATIONS

Teng, Chun-Yuen, Yu-Ru Lin, and Lada A. Adamic. "Recipe recommendation using ingredient networks." Proceedings of the 4th annual ACM web science conference. 2012. (Year: 2012).*

(Continued)

*Primary Examiner* — Christopher B Seibert
(74) *Attorney, Agent, or Firm* — FOLEY & LARDNER LLP

(57) ABSTRACT

Systems and methods for automated product recommendation are disclosed herein. This can include generating an entry, the entry corresponding to an item selected for purchase, in a mirror-cart linked with a user account and identifying a recipe associated with the selected item. This can include comparing items identified in the recipe to items contained in the mirror-cart to identify a missing item that is not in the mirror-cart, and then prompting the user to purchase the missing item. Automated product recommendation can include generating an entry in the mirror-cart linked to the missing item when the user selects the missing item for purchase, updating an invoice with price information for the selected missing item, and transferring the invoice to a point of sale terminal at the retail location.

20 Claims, 8 Drawing Sheets

(56) References Cited

U.S. PATENT DOCUMENTS

| | | | |
|---|---|---|---|
| 8,458,054 B1* | 6/2013 | Thakur | G06Q 30/0643 705/27.1 |
| 2001/0021914 A1* | 9/2001 | Jacobi | G06Q 30/02 705/26.1 |
| 2005/0162670 A1* | 7/2005 | Shuler | H04N 1/00408 358/1.2 |
| 2006/0155684 A1* | 7/2006 | Liu | G06F 16/954 |
| 2007/0046675 A1* | 3/2007 | Iguchi | G06T 11/206 345/441 |
| 2007/0087756 A1* | 4/2007 | Hoffberg | G06Q 10/06375 455/450 |
| 2008/0243816 A1 | 10/2008 | Chan | |
| 2008/0249865 A1 | 10/2008 | Angell | |
| 2008/0270363 A1* | 10/2008 | Hunt | G06F 16/2462 |
| 2008/0294996 A1* | 11/2008 | Hunt | G06Q 30/02 707/999.102 |
| 2008/0319829 A1* | 12/2008 | Hunt | G06Q 30/0201 705/7.29 |
| 2009/0006156 A1* | 1/2009 | Hunt | G06Q 30/02 705/7.11 |
| 2009/0018996 A1* | 1/2009 | Hunt | G06Q 30/02 |
| 2009/0110089 A1* | 4/2009 | Green | H04L 5/0037 370/329 |
| 2009/0125371 A1* | 5/2009 | Neylon | G06F 16/313 707/739 |
| 2010/0114933 A1* | 5/2010 | Murdock | G06F 16/58 707/765 |
| 2010/0268661 A1* | 10/2010 | Levy | G06Q 30/02 705/347 |
| 2012/0095853 A1* | 4/2012 | von Bose | G06Q 30/0641 705/16 |
| 2014/0195931 A1* | 7/2014 | Kwon | G06Q 30/02 715/753 |
| 2014/0321761 A1* | 10/2014 | Wang | G06F 16/583 382/218 |
| 2014/0330637 A1* | 11/2014 | Moran | G06F 3/0425 705/14.43 |
| 2014/0344013 A1* | 11/2014 | Karty | G06N 3/126 705/7.29 |
| 2014/0351079 A1* | 11/2014 | Dong | G06Q 30/0282 705/26.7 |
| 2015/0112790 A1* | 4/2015 | Wolinsky | G06Q 20/3274 705/14.38 |
| 2015/0120475 A1 | 4/2015 | Pedley et al. | |
| 2015/0154508 A1* | 6/2015 | Chen | G06F 16/951 706/12 |
| 2015/0178786 A1* | 6/2015 | Claessens | G06Q 30/0277 705/14.66 |
| 2015/0332374 A1* | 11/2015 | Fano | G06Q 30/0251 705/26.7 |
| 2015/0379732 A1* | 12/2015 | Sayre, III | G06T 11/001 382/164 |
| 2016/0155173 A1* | 6/2016 | Isaacson | G06Q 30/0617 705/26.43 |
| 2016/0180248 A1* | 6/2016 | Regan | G09B 5/00 706/12 |
| 2016/0292148 A1* | 10/2016 | Aley | G06F 40/274 |
| 2017/0193011 A1* | 7/2017 | Kale | G06N 20/00 |
| 2017/0193997 A1* | 7/2017 | Chen | G10L 15/26 |
| 2017/0220771 A1 | 8/2017 | Toupin et al. | |
| 2018/0040064 A1* | 2/2018 | Grigg | H04L 41/147 |
| 2018/0158078 A1* | 6/2018 | Hsieh | G06N 20/00 |
| 2018/0204111 A1* | 7/2018 | Zadeh | G06V 10/764 |
| 2018/0216946 A1* | 8/2018 | Gueye | G01C 21/3617 |
| 2018/0276710 A1* | 9/2018 | Tietzen | G06Q 30/0269 |
| 2018/0308112 A1* | 10/2018 | Prentice | G06Q 30/0202 |
| 2019/0019016 A1* | 1/2019 | Ikeda | H04N 23/611 |
| 2019/0066087 A1 | 2/2019 | Shayovitz | |
| 2019/0244270 A1* | 8/2019 | Kim | G06F 16/735 |
| 2020/0005364 A1* | 1/2020 | Aznaurashvili | H04W 4/80 |
| 2020/0175564 A1* | 6/2020 | Kulasooriya | G06N 3/08 |
| 2020/0184278 A1* | 6/2020 | Zadeh | G06N 3/044 |
| 2020/0211065 A1* | 7/2020 | Govindarajalu | G06Q 30/0279 |
| 2020/0320470 A1* | 10/2020 | Whitney | G06F 9/547 |
| 2021/0073612 A1* | 3/2021 | Vahdat | G06N 3/08 |
| 2021/0125255 A1* | 4/2021 | Ramakrishnan | G06N 20/00 |
| 2021/0125270 A1* | 4/2021 | Ramakrishnan | G06Q 30/04 |
| 2021/0382935 A1* | 12/2021 | Huang | G06F 16/532 |
| 2021/0397892 A1* | 12/2021 | Huang | G06F 18/2148 |
| 2023/0036394 A1* | 2/2023 | Shi | G06Q 30/0631 |
| 2023/0036964 A1* | 2/2023 | Shi | G06Q 30/0255 |
| 2023/0055699 A1* | 2/2023 | Raziperchikolaei | G06Q 30/0251 |

OTHER PUBLICATIONS

Padhi, Ila, Jibitesh Mishra, and Sanjit Kumar Dash. "Predicting missing items in shopping cart using associative classification mining." International Journal of Computer Applications 50.14 (2012). (Year: 2012).*

Google says machine learning is the future. So I tried it myself, Alex Hern Jun. 28, 2016 (Year; 2016).

Recommended For You: How machine learning helps you choose what to consume next, Jennifer Wei, Aug. 28, 2017 (Year; 2017).

Machine Learning: What it is and why it matters, SAS, Jan. 7, 2014 (Year; 2014).

* cited by examiner

AUTOMATED PRODUCT RECOMMENDATION

CROSS-REFERENCES TO RELATED APPLICATIONS

This application is a continuation of U.S. application Ser. No. 17/081,687, filed on Oct. 27, 2020, and entitled "ENHANCED SECURITY FOR TRANSACTION REQUESTS UTILIZING AUTOMATIC SOURCE IDENTIFICATION," which in turn claims priority from U.S. Provisional Application No. 62/926,988, filed Oct. 28, 2019, and entitled "AUTOMATED PRODUCT RECOMMENDATION," the entireties of which are hereby incorporated by reference herein.

BACKGROUND

A computer network or data network is a telecommunications network which allows computers to exchange data. In computer networks, networked computing devices exchange data with each other along network links (data connections). The connections between nodes are established using either cable media or wireless media. The best-known computer network is the Internet.

BRIEF SUMMARY

One aspect of the present disclosure relates to a method for virtual-cart enabled purchasing. This purchasing can be in an in-store environment. The method includes receiving a user identifier for a user at a retail location, which user identifier can be unique and/or anonymous. In some embodiments, this user identifier can be received subsequent to user creation of the user identifier. The method can include creating a mirror-cart linked with the received user identifier, and generating an entry in the mirror-cart corresponding to a physical item selected for purchase by the user. In some embodiments, the mirror-cart can exists in a cloud environment. The method includes generating an invoice corresponding to items in the virtual-cart, receiving a request for the invoice, for example, from a cloud network and/or from a point of sale terminal, transferring the invoice, for example, to a point of sale terminal, and receiving payment confirmation for the items in the virtual-cart and tracked in the invoice. In some embodiments, the invoice can be queued on a network to be picked up for payments when the user is at the point of sale terminal. In some embodiments, the invoice includes a price of the physical item selected for purchase and prices of any other items selected for purchase, and in some embodiments, the invoice generates a total price of all items selected for purchase. In some embodiments, the invoice can allow linking of one or several vouchers, coupons, and/or discounts with the items selected for purchasing.

In some embodiments, the method includes receiving a checkout request, that indicates completion of shopping and a desire to make payment, and delivering an indicator to the user identifying a point of sale terminal for making payment. In some embodiments, the method includes identifying a time for the user to arrive at the identified point of sale terminal. In some embodiments, the time for the user to arrive at the identified point of sale terminal can be based in part on the user's location in the retail location.

In some embodiments, the method includes receiving data indicative of the physical item selected for purchase by the user. In some embodiments, the data indicative of the physical item selected for purchase by the user can be generated based on a machine-readable code. In some embodiments, the machine-readable code can be at least one of: a 1D bar-code; and a 2D bar-code such as, for example, a QR-code or a SnapTag.

In some embodiments, data indicative of the physical item selected for purchase by the user can be generated based on a radio communication. In some embodiments, the radio communication can be a communication according to at least one of: an NFC communication protocol; and an RFID communication protocol. In some embodiments, the request for the invoice from the point of sale terminal includes the user identifier. In some embodiments, the invoice can be transferred to the point of sale terminal in response to receipt of the request for the invoice.

One aspect of the present disclosure relates to a system for virtual-cart enabled purchasing. This purchasing can be in an in-store environment. The system includes a memory including a plurality of databases. The plurality of databases includes a mirror database, an account database, and an inventory database. The system includes a server. The server can receive a user identifier for a user device at a retail location, which user identifier can be unique, create a mirror-cart in the mirror database, the mirror-cart linked with the user identifier, and generate an entry in the mirror-cart corresponding to physical item selected for purchase by the user. The server can generate an invoice corresponding to items in the virtual-cart, receive a request for the invoice from a point of sale terminal or from a central cloud-computing network, transfer the invoice to a point of sale terminal, and transact payment for the items in the virtual-cart and tracked in the invoice. In some embodiments, the invoice includes a price of the physical item selected for purchase and prices of any other items selected for purchase, and in some embodiments, the invoice generates a total price of all items selected for purchase.

In some embodiments, transferring the invoice to the point of sale terminal can include adding the invoice to a queue and then providing the invoice to the point of sale terminal when the invoice has reached a desired point in the queue. In some embodiments, the server can receive a checkout request, which checkout request indicates completion of shopping and a desire to make payment, and deliver an indicator to the user identifying a point of sale terminal for making payment. In some embodiments, the server can identify a time for the user to arrive at the identified point of sale terminal, this time for arrival identifying a future time window. In some embodiments, the time for the user to arrive at the identified point of sale terminal can be based in part on the user's location in the retail location.

In some embodiments, the server can receive data indicative of the item selected for purchase by the user. In some embodiments, the data indicative of the physical item selected for purchase by the user can be generated based on a machine-readable code. In some embodiments, the machine-readable code can be at least one of: a 1D bar-code, and 2D bar-code such as, for example, a QR-code or a SnapTag.

In some embodiments, data indicative of the physical item selected for purchase by the user can be generated based on a radio communication. In some embodiments, the radio communication can be a communication according to at least one of: an NFC communication protocol, a BLE communication protocol, and an RFID communication protocol. In some embodiments, the request for the invoice from the point of sale terminal or from the cloud-computing network can include the user identifier, and in some embodiments, the invoice can be transferred to the point of sale terminal in response to receipt of the request for the invoice.

One aspect of the present disclosure relates to a method of automated product recommendation. The method includes generating an entry in a mirror-cart linked with a user account, the entry corresponding to a physical item selected for purchase by the user in a retail location. The method includes identifying a recipe associated with the item, which recipe identifies other items that can be combined with the selected item to create a product, and comparing items identified in the recipe to items contained in the mirror-cart to identify a missing item, which missing item is identified in the recipe and is not contained in the mirror-cart. The method includes prompting the user to purchase the missing item, generating an entry in the mirror-cart linked to the missing item when the user selects the missing item for purchase, updating an invoice with price information for the selected missing item, which invoice identifies a total price of all items included in the mirror-cart, and transferring the invoice to a point of sale terminal.

In some embodiments, the item can be a food item. In some embodiments, the product can be a meal component. In some embodiments, the method includes receiving payment confirmation for payment for the items in the virtual cart and tracked in the invoice.

In some embodiments, identifying the recipe associated with the item includes generating features based on the selected item and any other items in the mirror cart and selecting the recipe having the strongest association with the generated features. In some embodiments, selecting the recipe having the strongest association with the generated features includes ingesting the generated features into a machine learning model trained to output a predicted recipe based on ingested features corresponding to items in the mirror cart and receiving the machine learning model output.

In some embodiments, prompting the user to purchase the missing item includes recommending purchase of the missing item. In some embodiments, prompting the user to purchase the missing item includes requesting a user input indicating whether the user desires to purchase the missing item, receiving a response to the request for user input, and prompting the user to purchase the missing item when the user response indicates a desire to purchase the missing item. In some embodiments, prompting the user to purchase the missing item includes determining a location of the user, determining a location of the missing item in the retail location, and providing directions for the user to the missing item. In some embodiments, prompting the user to purchase the missing item includes: determining a location of the user, determining a location of the missing item in the retail location, and providing directions for the user to the missing item.

In some embodiments, prompting the user to purchase the missing item includes requesting a user input indicating whether the user desires to purchase the missing item, receiving a response to the request for user input, requesting a user input regarding an intended recipe when the response to the request for user input indicates no desire to purchase the missing item, and updating the training of the machine learning model.

One aspect of the present disclosure relates to a system for automated product recommendation. The system includes a memory including a plurality of databases. The plurality of databases can include a mirror database, an account database, and an inventory database. The system can include a server. The server can generate an entry in a mirror-cart linked with a user account, the entry corresponding to a physical item selected for purchase by the user in a retail location, and identify a recipe associated with the item, which recipe identifies other items that can be combined with the selected item to create a product. The server can compare items identified in the recipe to items contained in the mirror-cart to identify a missing item, which missing item is identified in the recipe and is not contained in the mirror-cart, and prompt the user to purchase the missing item. The server can generate an entry in the mirror-cart linked to the missing item when the user selects the missing item for purchase, update an invoice with price information for the selected missing item, which invoice identifies a total price of all items included in the mirror-cart, and transfer the invoice to a point of sale terminal.

In some embodiments, the item can be a food item. In some embodiments, the product can be a meal component. In some embodiments, the server can receive payment confirmation for payment for the items in the virtual cart and tracked in the invoice. In some embodiments, identifying the recipe associated with the item includes generating features based on the selected item and any other items in the mirror cart, and selecting the recipe having the strongest association with the generated features.

In some embodiments, selecting the recipe having the strongest association with the generated features includes ingesting the generated features into a machine learning model trained to output a predicted recipe based on ingested features corresponding to items in the mirror cart, and receiving the machine learning model output. In some embodiments, prompting the user to purchase the missing item includes recommending purchase of the missing item.

In some embodiments, prompting the user to purchase the missing item includes requesting a user input indicating whether the user desires to purchase the missing item, receiving a response to the request for user input, and prompting the user to purchase the missing item when the user response indicates a desire to purchase the missing item. In some embodiments, prompting the user to purchase the missing item includes determining a location of the user, determining a location of the missing item in the retail location, and providing directions for the user to the missing item. In some embodiments, prompting the user to purchase the missing item includes determining a location of the user, determining a location of the missing item in the retail location, and providing directions for the user to the missing item. In some embodiments, prompting the user to purchase the missing item includes requesting a user input indicating whether the user desires to purchase the missing item, receiving a response to the request for user input, requesting a user input regarding an intended recipe when the response to the request for user input indicates no desire to purchase the missing item, and updating the training of the machine learning model.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1:
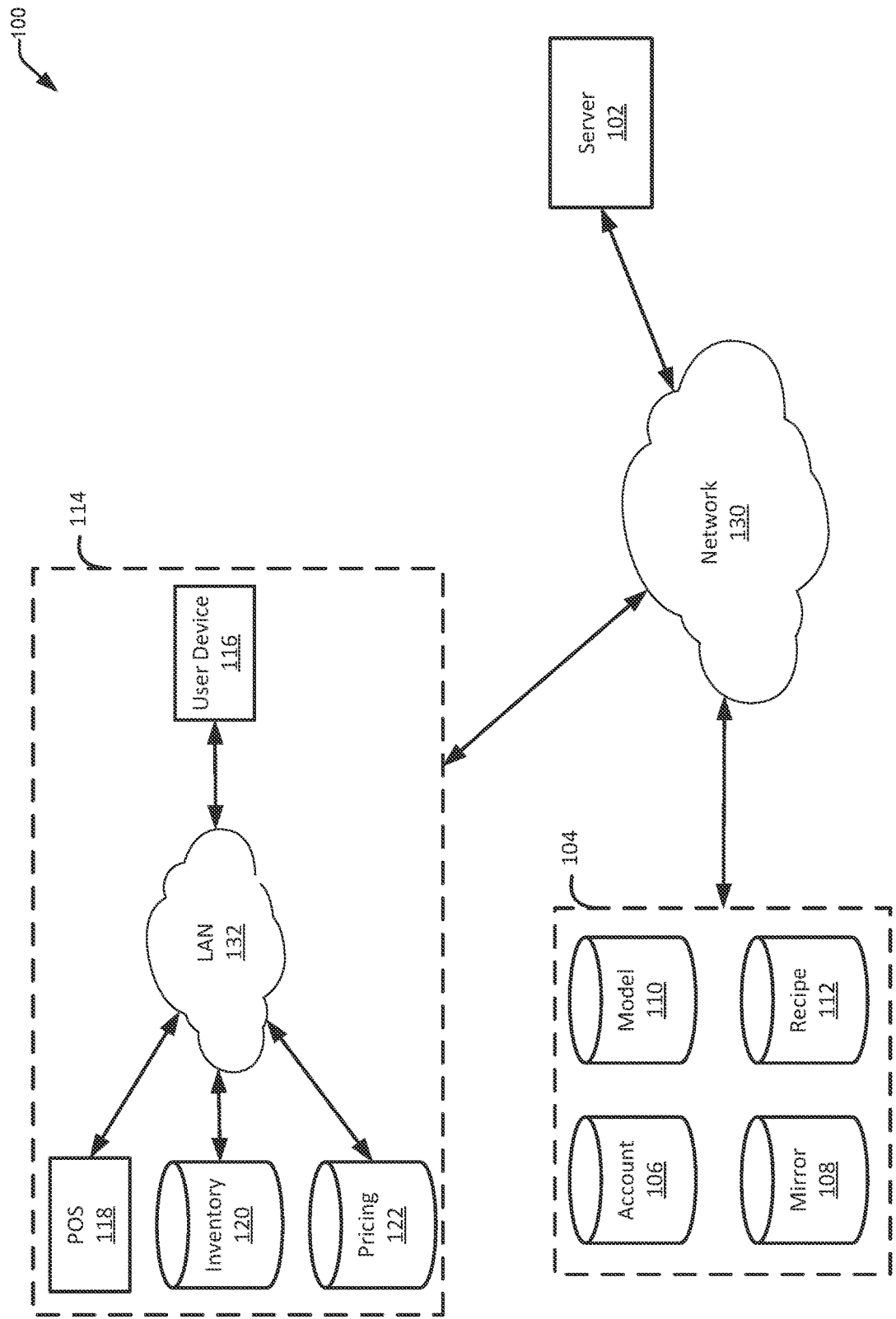
FIG. 1 is a block diagram illustrating one embodiment of a transaction and recommendations network.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability, or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Billions of transactions from point of sale ("POS") devices or other payment terminals are completed daily. While the POS devices have improved to enhance the actual transacting of payment and security of the same, time is still lost by shoppers in this payment process. Specifically, purchasers spend significant amount of time standing in lines (queues) waiting to complete payment for items being purchased. It has been estimated that lines, especially when they are long, result in significant numbers of lost sales to competitors as well as lost sales when a customer decides to forgo a purchase.

While problems of long lines are nearly universal, these problems are especially disadvantageous in certain industries, such as, for example, retailers, stadium retailers and restaurants, government and public service providers and transport networks. Such retailers and restaurants frequently receive customers in surges corresponding to event intermissions, and as such deal with long, and frequently slow lines.

However, new and pervasive technologies may be leveraged to eliminate or minimize long lines and their associated delays. This can include through the generation of unique user account, which generation of the unique user account can be performed by a user with a user device, which generation can be prompted when a user enters a geographic location. This determination of the entering of a geographic location, such as a location of a retailer, can be performed using one or several navigation systems or features including, for example, the Global Positioning System ("GPS"), GALILEO, or the like, or location systems or features including, for example, one or several transceivers that can determine location of user device via, for example, triangulation.

The user account can be generated by a processor, which can be located on the cloud, based on information received from the user device. The user account can be associated with a unique user identifier. A mirror cart can be generated in this user account, which mirror cart can include listing of items in the mirror cart and an invoice tracking price of individual items in the mirror cart, as well as the total cost of items in the mirror cart.

The user can select items for purchase, and can use their user device to provide an indicator and/or identifier of the selected items to the processor. For example, the user can use their user device to scan and/or generate an image of a portion of the product and/or of an item associated with the product. For example, the user can scan and/or generate an image of a computer readable code such as a barcode, which can include a 1D barcode, a 2D barcode such as a SnapTag a QR code, or any other computer readable code. In some embodiments, the user can scan and/or generate an image of text associated with the item, which text can be made computer readable via, for example, optical character recognition (OCR) or other technology, and based on the readable characters, the product can be identified. Other technologies can be used to identify the selected item including, for example, image/photo recognition, radio communication via communication protocol and an associated device such as via an RFID tag, a NFC enabled tag or feature, a Bluetooth Low Energy ("BLE") device, or the like. Thus, in some embodiments, the radio communication can comprise a communication according to at least one of: an NFC communication protocol; a BLE communication protocol; and an RFID communication protocol.

When an item is selected for purchase, the mirror cart can update the listing of items in the mirror cart and can update the invoice to reflect the new total price of items in the mirror cart. Similarly, a user can remove an item from the mirror cart by selecting an item for removal from the mirror cart. The mirror cart can then update the listing of items in the mirror cart and the invoice. In some embodiments, product ingredients, allergen information, or other information relating to the product can be provided to the user. This information can, in some embodiments, be provided to the user via augmented reality. In some embodiments, for example, when the user hovers the camera of their user device over the product, this information relating to the product can be provided to the user.

In some embodiments, items in the mirror cart can be analyzed to identify other potential items that the user may be interested in purchasing. This can include, for example, identifying a recipe corresponding to one or several items in the mirror cart, identifying items for that recipe, and recommending items from the recipe to the user for purchase. For example, if a user placed dough for a pizza in the mirror cart, pizza could be identified as the related recipe, typical items for making pizza could be identified, and these identified items could be recommended to the user for purchasing.

This recommending of items for purchasing can include requesting the user to indicate whether: they want to purchase one or several of the recommended items; and/or the recipe is the correct recipe. This information can be used to update the training of a machine learning model that can be used to match items in the mirror cart to a recipe and/or that can be used to recommend one or several items for purchase.

When the user has completed selection of items, the user can indicate completion of shopping, which indication can cause the processor to transmit the mirror cart, including the list of items and the invoice to a POS terminal. The processor can identify a POS terminal for the user to complete payment, and can transmit the mirror cart to this identified POS device. This mirror cart information can be queued on the network. Identification of the POS device can be based on a detected user location, a POS device that is designated for mirror cart purchases, a self-checkout POS device, and/or a POS device with the least traffic. In some instances, an arrival time can be provided to the user, which arrival time can identify a time and/or time window for the user to arrive at the designated POS device.

The user can arrive at the POS device, can transact payment with the POS device, and an indication of completion of payment can be provided to the processor. The processor can then empty the mirror cart. In some instances, the unique user account can be terminated simultaneous with the emptying of the mirror cart and/or shortly after the emptying of the mirror cart such as, for example, at closing time of the store. In some instances, the unique account can be terminated when it is determined that the user has left the location and/or when the retailer closes. In some instances, the user account may be stored for a predetermined amount of time, which predetermined amount of time may be reset each time the user makes a purchase at that retailer.

FIG. 1 is a schematic illustration of one embodiment a system 100 for virtual-cart enabled purchasing. The system 100 includes a processor 102, also referred to herein as server 102. The server 102 may be any desired type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. Server 102 may include one or more server farms, clusters, or any other appropriate arrangement and/or combination or computer servers. Server 102 may be a cloud server or virtual server running in a cloud computing environment, or alternatively can be a physical server. The server 102 may act according to stored instructions located in a memory subsystem of the server 102, and may run an operating system, including any commercially available server operating system and/or any other operating systems discussed herein.

The system 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives (e.g., Serial AT Attachment drives) or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the system 100. In some embodiments, multiple data stores may reside on a single server 104, either using the same storage components of server 104 or using different physical storage components to assure data security and integrity between data stores. In other embodiments, each data store may have a separate dedicated data store server 104. The data stores 104 can, in some embodiments, be located in the cloud and can comprise, for example, one or several cloud databases.

The database server 104 can include an account database 106, a mirror database 108, a model database 110, and a recipe database 112. The account database 106 can include information relating to one or several user accounts. In some embodiments, the account database 106 can comprise a plurality of user identifiers which can be, a unique identifier associated with a user, which identifier can be an alias name. In some embodiments, some or all of the user identifiers can comprise an identifier unique to the customer and/or unique to a user device. Such an identifier can include, for example, a telephone number, an IP address, an IMEI number, or the like. In some embodiments, the user identifier can be auto generated and assigned to a customer, and in some embodiments, a user can generate and provide an identifier to the system 100, which identifier can then be evaluated for uniqueness, and if unique, can be stored as an identifier for the user.

In some embodiments, in which user accounts are persistent, the account database 106 can include information relating to one or several of the user's previous purchases, and specifically relating to items previously purchased by the user. This information can include, for example, patterns in item purchase such as, frequency of purchase of one or several items, combinations of items purchased together, frequency of those combinations, or the like.

A user identifier in the account database 106 may be linked with one or several entries in the mirror database 108. In some embodiments, the mirror database 108 can include a mirror-cart database for each user, which mirror-cart database can include a list portion identifying items selected for purchasing by a user, and the mirror-cart database can include an invoice portion which can include price information for each item selected for purchasing by the user and can include price information for all items in the mirror cart, in other words, the invoice can include and/or generate a total price for all items selected for purchase and included in the mirror cart. As used herein, a mirror-cart database corresponds to a mirror cart for a user account, thus each user account is associated with a mirror cart, and items can be added to and/or removed from the mirror account, and the mirror database 108 can comprise a plurality of mirror-cart databases, each mirror-cart database associated with a unique one of a plurality of user accounts.

In some embodiments, the mirror-cart database 108 can be linked to the unique identifier in the account database 106 via one or several pointers. In some embodiments, for example, each unique identifier in the account database can be linked with a mirror-cart database in the mirror database 108 via a pointer.

As depicted in FIG. 1, the mirror database 108 can be located remote from the user device 116. In some embodiments, each user device 116 in the system 100 can include a mirror database 108 and/or can access the mirror database 108. In some embodiments, the system 100 can be configured for edge computing. In such an embodiment, for example, a user device 116 can include a local mirror database 108 and/or a local mirror-cart database unique for the user account of associated with that user device 116.

The model database 110 can include on or several models. These models can include one or several machine learning models such as, for example, one or several neural networks, classifiers, decision tree models—such as one or several classification tree models and/or regressions tree models, or the like. In some embodiments, one or several of these models can comprise a machine learning model trained to predict a recipe based on items within the mirror cart. In some embodiments, for example, one or several features can be generated from the items within the mirror cart, which one or several features can be ingested into the machine learning model. Based on these one or several features, the machine learning model can generate an output which can identify a recipe. In some embodiments, one or several of the models in the model database 110 can be trained to identify one or several ingredients based on one or several ingested features. These one or several ingested features can be generated based on the present contents of the mirror cart, and/or items recently in the mirror cart. In some embodiments, for example, after the user has complete shopping, data relevant to the user, which data can be stored in the user account, can include one or several recently purchased items and/or one or several items purchased within a specified time frame such as, for example, purchased in the past week, purchased in the past month, purchased within the past two months, or the like.

The recipe database 112 can include information identifying one or several recipes. In some embodiments, each of the one or several recipes in the recipe database 112 can be associated with items used in that recipes. As used herein, a recipe comprises a list of items used to create a desired object. The desired object can be a food object such as a food dish, meal, entrée, side, desert, salad, or the like. In some embodiments, the desired object can comprise any object including, for example, a decorative object, a craft, a piece of furniture, a toy, a tool, or the like. These items used in the recipe can include any items used to create the object and can include, for example, one or several food items including, one or several vegetables, one or several fruits, one or several spices or spice mixes, one or several pieces of meat, one or several meal components, or the like. In some embodiments, the items can comprise one or several, one or several utensils, pans, kitchen tools, paint, glue, brushes, scissors, pliers, hammer, paper, or the like.

The system 100 can include one or several items located in, and/or associated with a retailer 114. In some embodiments, the retailer 114 can comprise a location at which one or several goods and/or services are sold. These goods and/or services can include, for example, food sold by a restaurant, groceries, or any other item(s) sold by a retailer 114. Although depicted separately, in some embodiments, the server 102, the database server 104, and the retailer 114 can be managed by a common entity.

The system 100 can include a user device 116. The user device 116 can display content received via the system 100, and may support various types of user interactions with the content. User devices 106 may include mobile devices such as smartphones, tablet computers, personal digital assistants, and wearable computing devices. Such mobile devices may run a variety of mobile operating systems and may be enabled for Internet, e-mail, short message service (SMS), Bluetooth®, mobile radio-frequency identification (M-RFID), and/or other communication protocols. Other user devices 106 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 130.

In different contexts of the system 100, user device(s) 116 may correspond to different types of specialized devices. In some embodiments, user devices 116 may operate in the same physical location, such as in the retailer 114. In such cases, the devices may contain components that support direct communications with other nearby devices, such as wireless transceivers and wireless communications interfaces, Ethernet sockets or other Local Area Network (LAN) interfaces, etc. The user device 116 can execute a software application that interacts with the server 102 to enable creation of the user account and use of the mirror cart. In some embodiments, the user device 116 can interact with the server 102 via a webpage.

The system 100, and specifically the retailer 114, includes at least one POS device 118, which POS device 118 can be, for example, a SmartPOS device or a CloudPOS device. The POS device 118 can communicate with the user device 116, and specifically can receive a checkout request from the user device 116, can transact payment, and provide confirmation of the completion of payment.

The system 100 can include an inventory database 120 and a pricing database 122. The inventory database 120 can be associated with the retailer 114, and in some embodiments, can be stored in memory located in the retailer 114. Alternatively, the pricing database 122 and the inventory database 120 can be centrally stored and/or controlled. In some embodiments, for example, the pricing database 122 and/or the inventory database 120 can be managed and/or maintained by an external entity program on behalf of the retailer 114 and with inputs received from the retailer 114.

The inventory database 120 can include information relating to items available for purchase at the retailer 114. This can include, for example, the location of items available for sale such as, for example, an aisle and shelf location, a quantity of items available for sale, attributes of the item for sale, or the like. The inventory database 120 can further include information relating to the layout of the retailer 114. This information can include a map of the layout of the retailer 114, including the number and position of aisles within the retailer 114. The pricing database 122 can include information relating to the pricing of items in the inventory database 120 and/or available for purchase at the retailer 114. In some embodiments, the inventory database 120 and/or the pricing database 122 can be located in memory in the retailer 114, and in some embodiments, the inventory database 120 and/or the pricing database 122 can be located remote from the retailer 114, and in some embodiments, can be located in the cloud.

The components of the system 100 can communicate via network 130. The system 100 can include any number of different communication networks 130 between any of the system components and devices shown in FIG. 1 and/or other devices described herein. Communication networks 130 may enable communication between the various computing devices, servers, and other components of the system 100. As discussed below, various implementations of system 100 may employ different types of networks 130, for example, computer networks, telecommunications networks, wireless networks, and/or any combination of these and/or other networks. In some embodiments, the network can be a wireless communication network and/or a wired communication network. In some embodiments, the network 130 can comprise the internet.

The components within the retailer 114 can be communicatingly coupled. In some embodiments, some or all of these components in the retailer 114 can communicate via one or several wired and/or wireless connections. In some embodiments, these components in and/or at the retailer 114 can be coupled via a network 132 such as, for example, a Local Area Network (LAN) or Wide Area Network (WAN). In some embodiments, for example, the devices in the retailer can be coupled via a Wireless Local Area Network (WLAN) associated with the retailer 114. In some embodiments, some or all of the components of the retailer 114 can communicate with one or several items of the system 100.

By way of example, in some embodiments, a user can generate a user account. The user account can be generated via interaction of the user device 116 with the server 102. In some embodiments, the user can provide a proposed user identifier to the server 102 via the user device 116, and the server 102 can determine if the proposed user identifier is unique. This can include comparison of the proposed user identifier to user identifiers already associated with user accounts and stored in the account database 106. If the user identifier is unique, then a new user account can be created and associated with the user identifier, and the new user account and associated user identifier can be stored in the account database 106. In some embodiments, the server 102 can propose and/or provide a user identifier to the user in response to a request for creation of the user account, which user identifier can be unique. The server 102 proposed user identifier can be linked with a user account that can be generated and stored, along with the associated user identifier, in the account database 106. In some embodiments, a unique identifier associated with the user device 116, such as a phone number, an IP address, an IMEI number, or the like, can be used as the user identifier. In such an embodiment, the user account can be generated and stored in the account database 106 in connection with the user identifier.

In some embodiments, a prompt can be provided to the user via the user device 116 upon the user entering the retailer 114. This prompt can indicate opportunity to use a preexisting user account for access to a mirror cart or can invite the user to create a user account to access a mirror cart. In some embodiments, this prompt can be trigger based on the user device 116 entering a location associated with the retailer 114. This entering of the location associated with the retailer 114 can be determined based on, for example, navigation features of the user device 114 and one or several geo-fences, based on communication with one or several devices at the retailer, or the like. In some embodiments, for example, a prompt may be delivered to the user device 116 when the user device connects to the network 132.

After creating the user account, the user can select one or several items for purchasing. The selection of these items can include receiving data associated with these items at the user device 116. The data can be received by the user device 116 via manual entry of this data into the user device 116, and/or via the capture of this data by the user device 116. In some embodiments, for example, the user device can capture this data via an interaction with all or a portion of the selected item and/or via an interaction with all or a portion of content associated with the item. In some embodiments, for example, the user can use the user device 116 to scan and/or generate an image of a computer readable code on the item and/or associated with the item. An example of a computer readable code associated with the item may be a computer readable code on a shelf label at the location in the retailer 114 where the item is offered for sale. Such computer readable codes can include a barcode such as a 1D barcode and/or a 2D barcode such as a QR code or SnapTag. In some embodiments, the user device 116 can receive and/or capture data relating to the item via communication with the item such as via a radio communication with the item via, for example, an RFID tag, a BLE device, or an NFC chip. The user device 116 can communicate the received and/or captured data to the server 102. Thus, in some embodiments, the server 102 can receive the scan and/or generated image of the computer readable code on and/or associated with the item. The server 102 can, based on this received scan and/or received generated image, generate data indicative of the item and/or identifying the item.

This data can be used to identify the item and add the item to the mirror cart. In some embodiments, this can include transferring this data to the server 102, which server 102 can then add these items to the mirror cart and to the mirror database 108. Alternatively, in some embodiments, the mirror cart can be stored locally on the user device 116, and the user device 116 can add these items to the mirror cart by adding them to the mirror database 108 locally on the user device 116.

In some embodiments, the adding of the item to the mirror cart can include retrieving information relating to the selected item from a database such as, for example, the pricing database 122. In some embodiments, and as part of adding of the item to the mirror cart, pricing information can be received from the pricing database 122. This pricing information can be received by the user device 116 when the mirror database 108 and/or mirror-cart database is stored locally on the user device 116, and this pricing information can be received by the server 102 when the mirror database 108 is remote from the user device 116.

The item can be added to the mirror cart, and specifically, identification of the item, such as the name of the item can be added to a list of items in the mirror cart, and price information for the item can be added to an invoice for the items in the mirror cart. This invoice can include information relating to individual items, as well as to the items in aggregate.

In some embodiments, after an item has been added to the mirror cart, the server 102 can identify the item and/or items in the mirror cart, and generate features based on the items in the mirror cart. The server 102 can identify a model, such as a machine learning model relevant to the generated features, and can ingest the features into the machine learning model. In some embodiments, a machine learning model may be specific to one or several item and/or feature types, and the selecting of the relevant machine learning model can include identifying the item and/or feature types, and identifying the machine learning model associated with those item and/or features types.

The generated features can be ingested into the model, which model can output a prediction of related items, and/or can output a recipe. The recipe can identify one or several items that can be used to create a desired object. For example, the desired object may be a dish, a meal, or the like, and the one or several items to create that desired object can be one or several ingredients. The server 102 can then compare items in the mirror cart to the items identified by the recipe and/or identified by the model output, and can, based on this comparison, identify one or several missing items.

The user can then be prompted to purchase these missing items, which prompting can include the generating of one or several messages identifying the missing items and sending these one or several messages to the user device 116. The user device can then display the prompt to the user, which prompt can ask the user if they want to purchase one, several, or all of the missing items, and/or can ask the user if the recipe is relevant. In response to these prompts, the user can provide inputs to the user device 116, which prompts can be communicated to the server 102. The server can, in response to these responses, update training of the model used in the identifying of the missing items.

If the user desires to purchase one or several of the missing items, information relating to the location of the one or several items can be received from the inventory database 120, which inventory database 120 can be locate to the retailer 114 or can be located in the database server 104 and can be linked with the retailer 114. The inventory database 120 can include information identifying whether the missing item is in stock and identifying the location of the missing item in the store, which location can specify, for example, an aisle and/or shelf location of the missing item. In some embodiments, the location of the item can be associated with an address of the item, such as, for example, grid coordinates for the item. These grid coordinates can be expressed as, for example, GPS coordinates, an address in a Natural Area Coding System and its derived systems such as, for example, the Universal Address System, the Global Postal Code System, the Universal Property Identifier System, and the Universal Map Grids System. In some embodiments, directions guiding the user from their present location to the location of the item can be generated. If the user selects one of the missing items for purchase, the missing item can be added to the mirror cart in the same fashion as discussed above.

When the user has completed shopping, the user can, via the user device 116, provide an indicator of completion of shopping, which indicator can, in some embodiments, indicate a desire to transact payment. This indicator can be communicated by the user device 116 to the server 102 and/or to the POS device 118. The user can then proceed to the POS device 118 to transact payment, and the invoice can be transferred from the mirror cart to the POS device 118. This transfer can occur from the mirror database 108 via the network 130 to the server 102. The server 102 can then provide the invoice to the POS device 118. In some embodiments, the invoice and/or an indicator of the user can be added to a queue associated with the POS device 118 and/or associated with payment. In some embodiments, the placement in the queue can be a default placement such as, for example, last in the queue, and in some embodiments, the placement in the queue can be based on one or several attributes of the user and/or of the mirror cart. In some embodiments, for example, the placement in the queue may be more favorable when fewer items are in the mirror-cart. When the user's position in the queue has advanced to a predetermined position, such as, for example, next customer to transact payment, then the invoice can be provided to the POS terminal 118.

In some embodiments, the user can receive an assigned POS device 118 for transacting of payment. This assigned POS device 118 can be selected as having the shortest wait time and/or as being the closest to the user. In some embodiments, additional services can be booked based on, for example, the wait time of the POS device 118. These services can include, for example, a car service.

In some embodiments, the user can receive an arrival time indicating when the user should arrive at the POS device 118. By arriving at the POS device 118 at the arrival time, the user can avoid waiting in a line, and can immediately, or quickly transact payment. This arrival time can be selected based on, for example, the users location relative to the POS device 118, the users average speed of movement, an estimated time at which the user could arrive at the POS device 118, or the like.

After the user has transacted payment, the POS device 118 can indicate the completed status of payment to the server 102 and/or to the user device 116, and the mirror cart can be emptied. In some embodiments, user accounts can be non-persistent, and the user account can be terminated with the transacting of payment and the emptying of the mirror cart, or, the user account can be terminated when the user leaves the retailer 114. In some embodiments, the user account can be maintained for a predetermined time, and then be terminated. In some embodiments, this predetermined time can be a number of minutes, hours, days, weeks, months, years, or the like, and in some embodiments, this predetermined time can be the remainder of hours that the retailer is open the day of purchase. In some embodiments, this predetermined time can be restarted when a user makes a new purchase. Alternatively, in some embodiments, the user account can remain active until terminated by the user. In connection with termination of the user account, the user account and the associated user identifier can be deleted from the account database 106.

Figure 2:
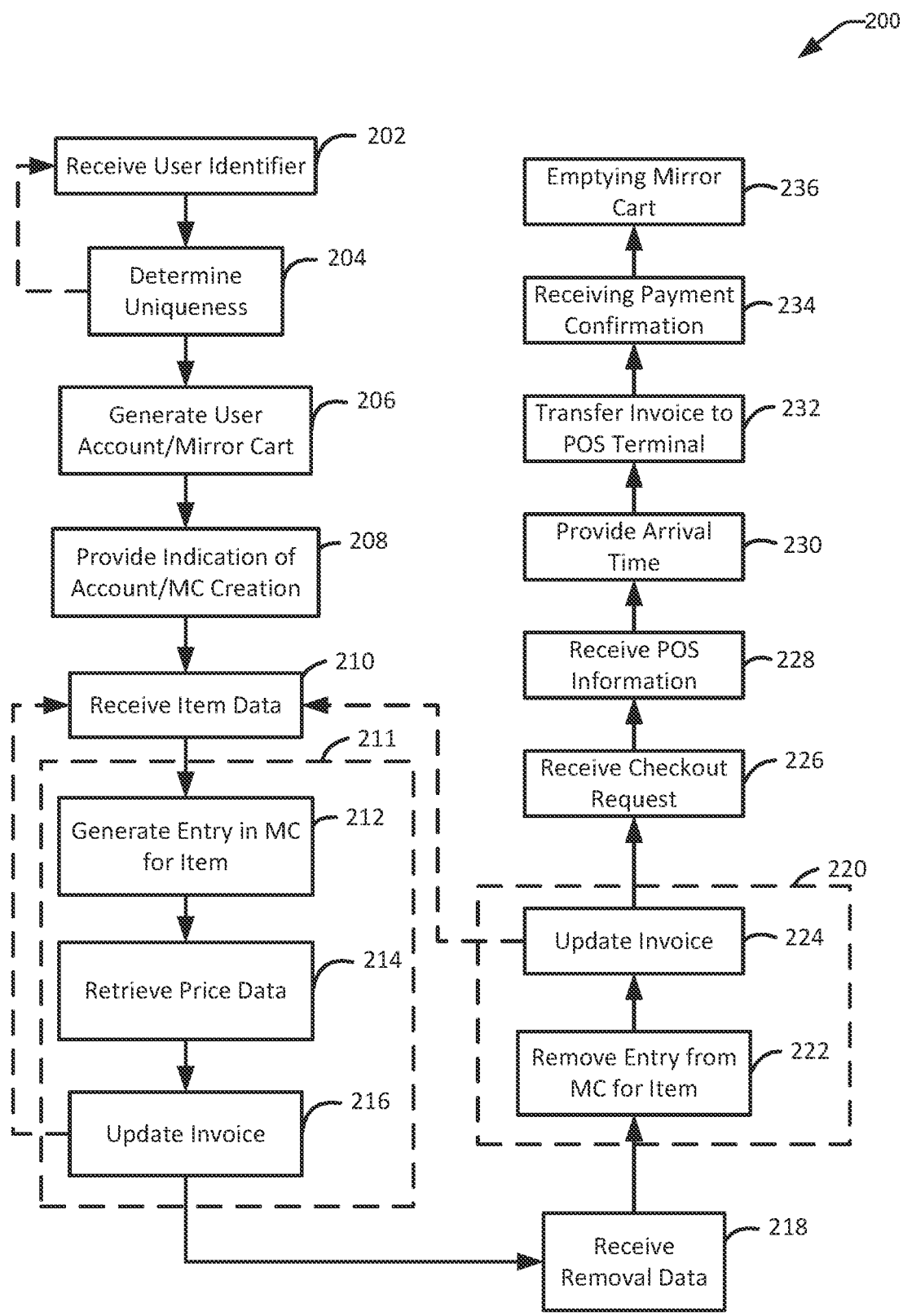
FIG. 2 is a flowchart illustrating one embodiment of a process for virtual cart enabled purchasing.

FIG. 2 is a flowchart illustrating one embodiment of a process 200 for virtual cart enabled purchasing in an in-store environment. The process 200 can be performed by all or portions of the system 100 including, for example, the server 102. The process 200 begins at block 202, wherein a user identifier is received by the server 102 from the user device 116. At block 204, the server 102 determines the uniqueness of the user identifier. The determination of uniqueness can include querying the account database 106 to determine whether the user identifier is already associated with the user account. If the user identifier is not unique, the process 200 can return to block 202, the user identifier can be identified as non-unique, and unique user identifier can be proposed or a new user identifier can be proposed. The process of steps 202 and 204 can be repeated until a unique user identifier is found.

When a unique user identifier is found, the process 200 proceeds to block 206, wherein a user account and a mirror cart is generated. The user account and the mirror cart can be generated by the server 102. This can include entering the user identifier into the account database 106 and linking the user identifier in the account database 106 to a portion of the mirror database 108. In some embodiments, this portion of the mirror database 108 can comprise the mirror-cart database for the created user account. Upon creation of the account and/or the mirror cart, an indication of the creation of the account and/or mirror cart can be provided to the user device 116 by the server 102 as indicated in block 208, and can be provided by the user device 116 to the user.

At block 210 item data can be received by the server 102 from the user device 116. This item can be, in some embodiments, a physical item. As discussed above, this item data can be entered into the user device 116 and/or can be generated via scanning the item or related object, imaging the item or related object, and/or communicating with the item or related object. Upon receipt of the item data, the mirror cart can be updated with the item as indicated in block 211 by the server 102. In some embodiments, updating of the mirror cart can include updating of the mirror-cart database and/or updating of the mirror database 108.

In some embodiments, as a part of updating the mirror cart, the item can be entered into the mirror cart, and specifically the item can be entered into a list of items in the mirror cart as indicated in block 212. In some embodiments, the item data can be used to retrieve and/or receive price data for the item from the pricing database 122 as indicated at block 214, and this price data can be added to an invoice in the mirror cart, which invoice can track the price of individual items in the mirror cart as well as the total price of all items in the mirror cart. In some embodiments, and as part of block 211, the updated mirror cart, and specifically the updated list of items in the mirror cart and the updated invoice, or portions thereof, can be displayed and/or provided to the user via the user device 116.

Blocks 218 through 224 illustrate a sub-routine that may be optionally performed as part of process 200 by, for example, the server 102 to remove an item from the mirror cart. At block 218, removal data is received by, for example, the server 102. This can be a request to remove an item from the mirror cart. In some embodiments, the removal data can comprise the selection of an item from the list of items in the mirror cart and an input indicating a desire to remove the item from the mirror cart. In some embodiments, the removal data can include data from the item which can be generated and/or entered as discussed above with respect to block 210.

Upon receipt of the removal data, the mirror cart can be updated as indicated in block 220. The updating of the mirror cart can include the removal of the entry of the item in the list of items in the mirror cart as indicated in block 222, and the updating of the invoice to remove price information for the item from the invoice as indicated in block 224. In some embodiments, updating of the mirror cart can include updating of the mirror-cart database and/or updating of the mirror database 108. Some or all of steps 210 through 224 can be repeated until a checkout request is received.

At block 226, a checkout request is received, which checkout request is an indication of completion of shopping and/or a desire to make payment The checkout request can be received by the server 102 from, for example the user device 116. In some embodiments, if it is determined that the retailer is shutting, or placing a restriction on purchase of an item in the mirror cart, a checkout prompt can be sent to the user device 116 from, for example, the server 102 and/or the POS device 118. In response to receipt of this prompt, the user can, upon completion of shopping, provide an indication of the completion of shopping and the checkout request can be sent to the server 102. In some embodiments, subsequent to receipt of the checkout request, the user can be added to a queue of users waiting to transact payment, which queue can comprise a virtual queue. As discussed above, placement in the queue can be default or can be custom based on one or several attributes of the user or the mirror-cart.

After the checkout request is received, or after the user has achieved a desired queue position, POS device information is received as indicated in block 228 by, for example, the server 102. This can include information identifying POS devices 118 and the location of those POS devices 118 in the retailer 114. In some embodiments, this information can further identify a wait time associated with each of the POS devices 118. After the POS information is received, an arrival time can be determined and provided by the server 102. The arrival time can be a time that the user should arrive at the POS device 118 to avoid and/or to minimize waiting. In some embodiments, additional services can be booked based on, for example, the estimated arrival time of the user. These services can include, for example, a car service.

At block 232, the server 102 and/or the mirror cart transfer the invoice to the POS device 118. In some embodiments, this can include the transfer of the list of items and the invoice to the POS device 118, which transfer can be performed by the server 102 and/or the user device 116. In some embodiments, this transfer of the invoice to the POS terminal can be, for example, in response to a request for the invoice from the POS device 118 or from the server 102, which invoice request can include the user identifier associated with the user account. At block 234 a payment confirmation is received by the server 102 from the POS terminal, and at block 236, the mirror cart is emptied by the server 102. This payment confirmation indicates payment for the items in the virtual cart and tracked in the invoice.

Figure 3:
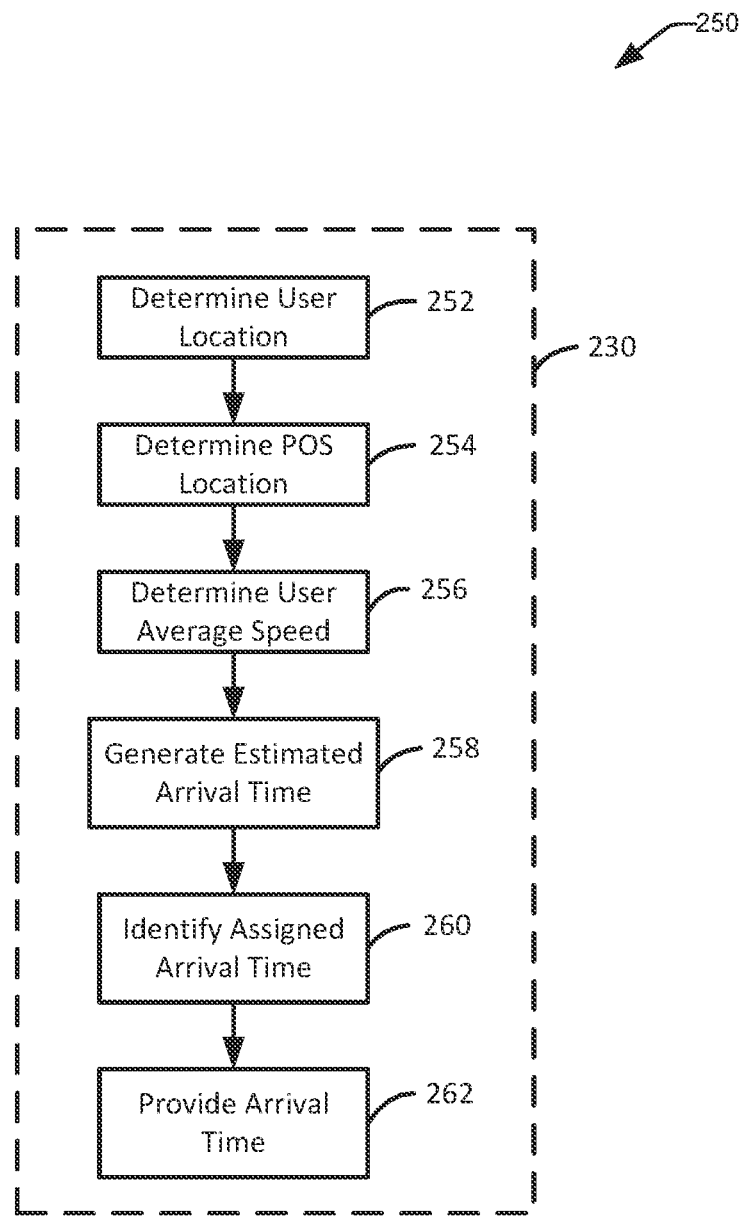
FIG. 3 is a flowchart illustrating one embodiment of a process for determining an arrival time.

With reference now to FIG. 3, a flowchart illustrating one embodiment of a process 250 for determining an arrival time is shown. The process 250 can be performed as a part of, or in the place of step 230. In some embodiments, the process 250 can be performed by the server 102. The process 250 begins at block 252, wherein the user location is determined, and specifically, wherein the user location in or with respect to the retailer is determined. The location of the user can be determined using one or several features of the user device 116. In some embodiments, the determination of the location of the user can comprise the server 102 querying the user device 116 for location information, and receiving location information from the user device 116.

At block 254, the position of the POS device 118 is determined. In some embodiments, this determination can be made based one or several features of the POS device 118, and in some embodiments, the location of the POS device 118 can be stored in a database. In some embodiments, determining the location of the POS device can comprise the server 102 querying one or several POS devices 118 for location information, and receiving location information from some or all of the one or several queried POS devices 118. In some embodiments, determining the location of the POS device 118 can comprise the server 102 querying the database containing POS device location information for this information, and receiving the location information from this database.

At block 256, the user movement speed is determined. The user movement speed can be determined, in some embodiments, by the server 102. The user movement speed can, in some embodiments, be determined by the server 102 based on information received from the user device 116. In some embodiments, this user movement speed can be an average movement speed of the user since entering the retailer, or the average movement speed of the user in some predetermined time frame. In some embodiments, a default average speed can be stored in memory and can be retrieved at step 256. This default average speed can vary based on one or several attributes of the user and/or based on one or several attributes of the retailer. These categories can include, for example, an age, a disability, a shopper density in the retailer, presence of a small child, or the like. In some embodiments, for example, the default average speed can include a first default average speed for users with one or several small children, a default average speed for disabled users and/or for users having one or several disabilities, a default average speed set based on an age of the user, and/or a default average speed set based on a number of shoppers in the retailer 114.

At step 258, an estimated arrival time is generated by, for example, the processor 102. This estimated arrival time can be generated based on the user location, the location of the POS, and the user movement speed. In some embodiments, for example, one or several routes from the user location to the POS device 118 can be determined, and estimated arrival times can be generated for each of these one or several routes. In the event of multiple routes, the arrival time can be estimated based on, for example, an average of the arrival times for different routes, the latest arrival time, or the earliest arrival time.

Based on the estimated arrival time, an assigned arrival time can be identified as indicated in block 260. In some embodiments, this assigned arrival time can be identified by the server 102. In some embodiments, the assigned arrival time can be a time subsequent to the estimated arrival time such as, for example, a one minute after the estimated arrival time. In some embodiments, the assigned arrival time can be the estimated arrival time plus an additional amount of time, which additional amount of time can be fixed, or can be variable based on the amount of time estimated for the user to travel from the user's location to the POS terminal. Thus, in some embodiments, if it is estimated that it will take longer for the user to travel to the POS terminal 118, then the assigned arrival time will be assigned later after than the estimated arrival time than would be the case if it is estimated that it will take less time for the user to move to the POS terminal 118.

At block 262, the arrival time is provided by the server 102 to the user device 116. In some embodiments, and as a part of providing of the arrival time, the identification of a POS device for transacting payment can be identified. Thus, an arrival time and an arrival location can be provided to the user device 116 and/or to the user. The user device 116 can, in some embodiments, provide the arrival time to the user. In some embodiments, the user device 116 can provide the arrival time to the user via display of the assigned arrival time to the user.

Figure 4:
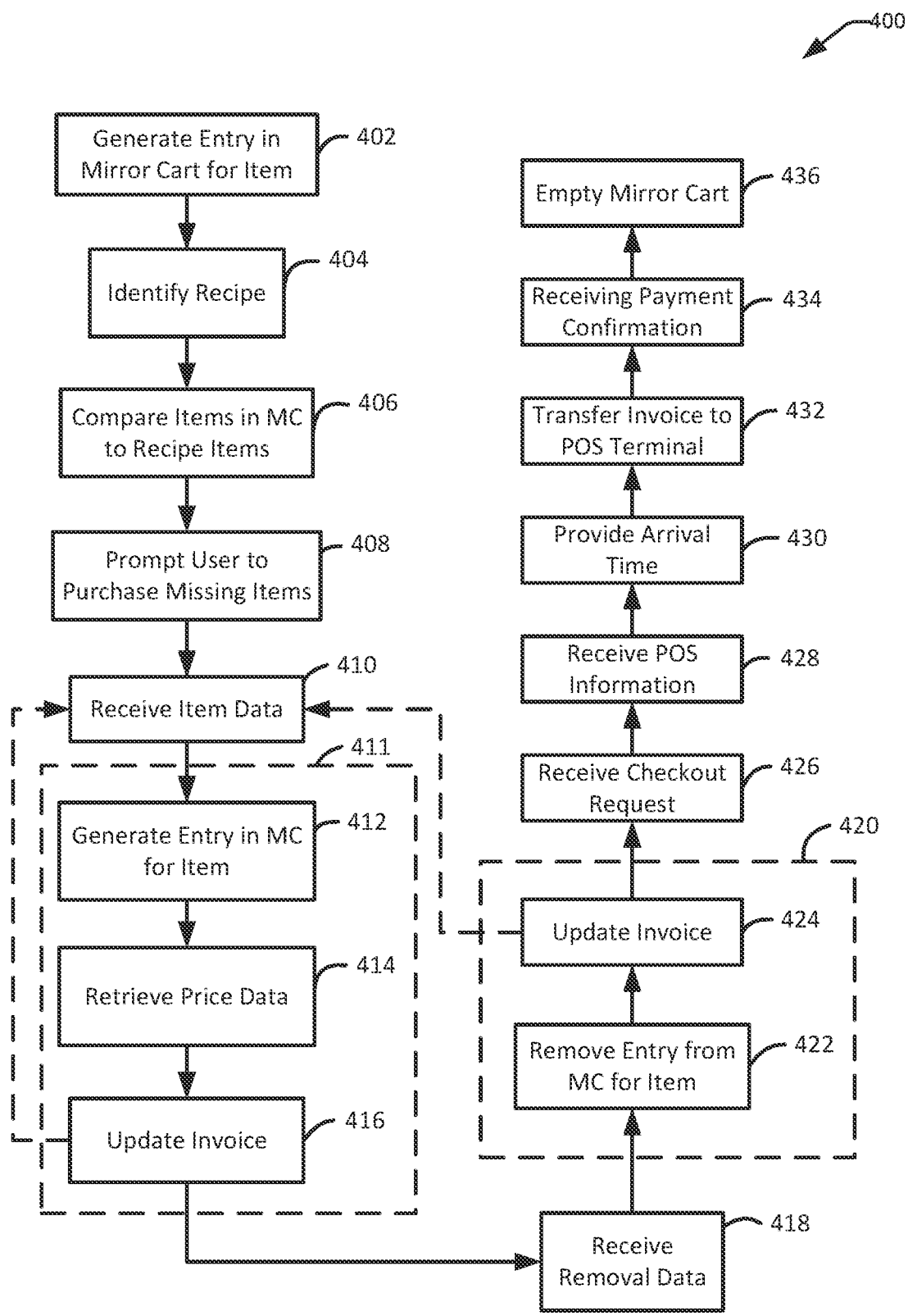
FIG. 4 is a flowchart illustrating one embodiment of a process for automated content recommendation.

FIG. 4 is a flowchart illustrating one embodiment of a process 400 for automated content recommendation. The process 400 can be performed by all or portions of the system 100 include, for example, by the server 102. The process 400 can be proceeded by one or several steps of process 200 including, for example, some or all of steps 202-210. In some embodiments, the process 400 begins at step 402, wherein an item is entered into the mirror cart. In some embodiments, step 402 can correspond with step 211 of process 200.

At block 404, a recipe is identified by, for example, the server 102. In some embodiments, this recipe can be identified based on the item placed in the mirror cart in block 402, and in some embodiments, this recipe can be identified based on the item placed in the mirror cart in block 402 as well as on other items in the mirror cart. In some embodiments, the recipe can be identified via the use of a statistical model, or more specifically via a machine learning model trained to output an identified recipe in response to the receipt of inputs relating to items in the mirror cart. This recipe can include a list of items used in the creation of the product with the recipe.

In some embodiments, step 406 can include the direct identification by the server 102 of potential missing items from the mirror cart. In some embodiments, for example, the machine learning model can be trained to identify potential missing items based on features generated from the items in the mirror cart, and in some embodiments, these features can be generated based on items in the mirror cart as well as based on historic data relating to the user's previous purchases, which historic data is contained in the account database 106.

At block 406, items in the recipe are compared, by the server 102, to items in the mirror cart to identify potential missing items. Items identified in the recipe and not found in the mirror cart, or not having a proxy in the mirror cart, are identified by the server 102 as missing.

At block 408, the user is prompted to purchase one or several of the identified missing items. Prompting the user can include generating with the server 102 a prompt and sending this prompt by the server 102 and to the user device 116. The user device 116 can deliver the prompt to the user. This prompt can, in some embodiments, include recommending the user purchase one, some, or all of the missing items. This prompt can include the identification of the potentially missing items and requesting the user indicate whether the user desires to purchase one or several of this missing items. In some embodiments, the prompting of the user to purchase one or several missing items can include adding, with the server 102, the one or several items to a shopping list of the user, which shopping list may be linked with the user account and stored in the account database 106. In some embodiments, for example, the user can generate a shopping list that can be stored in the account database 106 associated with the user. In some embodiments, potentially missing items can be added to this shopping list by the server 102. In some embodiments, these potentially missing items can appear different than items added to the shopping list by the user to allow easy identification of these potentially missing items as provided by the server 102.

Blocks 410 through 436 can be the same as the steps of blocks 210 through 226 shown in process 200 of FIG. 2. In some embodiments, the steps of blocks 410 through 436 can be performed with one or several items identified as potentially missing items and/or with the inclusion of one or several of the items identified as potentially missing in the mirror cart.

Figure 5:
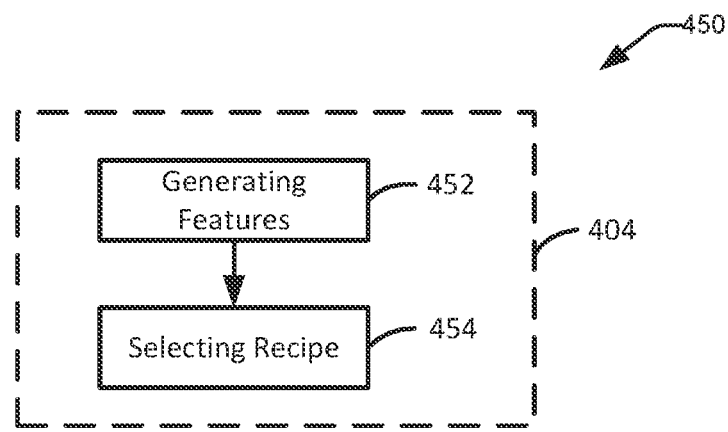
FIG. 5 is a flowchart illustrating one embodiment of a process for identifying a recipe.

With reference now to FIG. 5, a flowchart illustrating one embodiment of a process 450 for identifying a recipe is shown. The process 450 can be performed by the server 102. The process 450 can be performed as a part of, or in the place of step 404 of FIG. 4. The process 450 begins at block 452, wherein features are generated by the server 102. In some embodiments, the features can be generated from some or all of the items in the mirror cart. In some embodiments, the items in the mirror cart can be clustered, and the features can be generated from the clusters of items in the mirror cart. Thus, in some embodiments, for example, in a mirror cart containing cleaning supplies, cookware, and food items, clustering may result in a first group of items that are cleaning supplies, a second group of items that are food items, and a third group of items that are cookware. In some embodiments, features can be generated for some or all of these groups, alone or in combination. In some embodiments, the clusters may be evaluated for relevance by the server 102, and then clusters having high relevance may be used together by the server 102 to generate features, whereas clusters with low relevance may have separately generated features by the server 102. Thus, as cookware may provide insight into the recipe being made, the cookware cluster and the food item cluster may have high relevance, and features may be at least partially generated based on the combination of cookware items and food items in the mirror cart.

After features have been generated, a recipe can be selected by the server 102 as indicated in block 454. In some embodiments, this recipe can be selected based on the features generated in block 452. In some embodiments, this recipe can be selected via a statistical model such as, for example, a machine learning model. In some embodiments, the recipe having the strongest association with the generated features can be selected.

Figure 6:
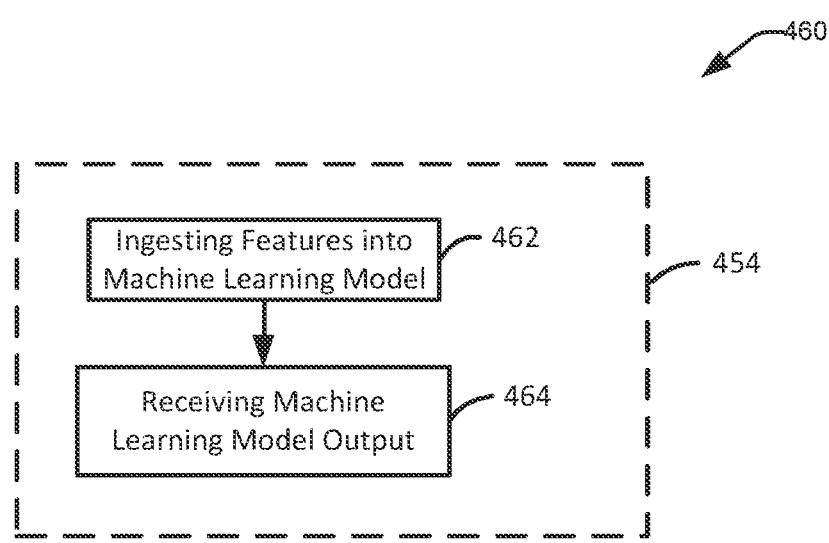
FIG. 6 is a flowchart illustrating one embodiment of a process for selecting a recipe.

With reference now to FIG. 6, a flowchart illustrating one embodiment of a process 460 for selecting a recipe is shown. The process 460 can be performed as a part of, or in the place of block 454 of process 450. The process 460 begins at block 462, wherein the features generated in block 452 are ingested into a machine learning model. In some embodiments, this ingestion can include the formatting and/or manipulation of the features generated in block 452 so that the features are in a desired format and/or form. After the features have been ingested into the machine learning model, the process 460 proceeds to block 464, wherein the machine learning model outputs a selected recipe.

Although the process 450 and 460 recite the selecting of a recipe, processes 450 and 460 can be performed to select missing items via use of a machine learning model trained to output missing items based on ingested features.

Figure 7:
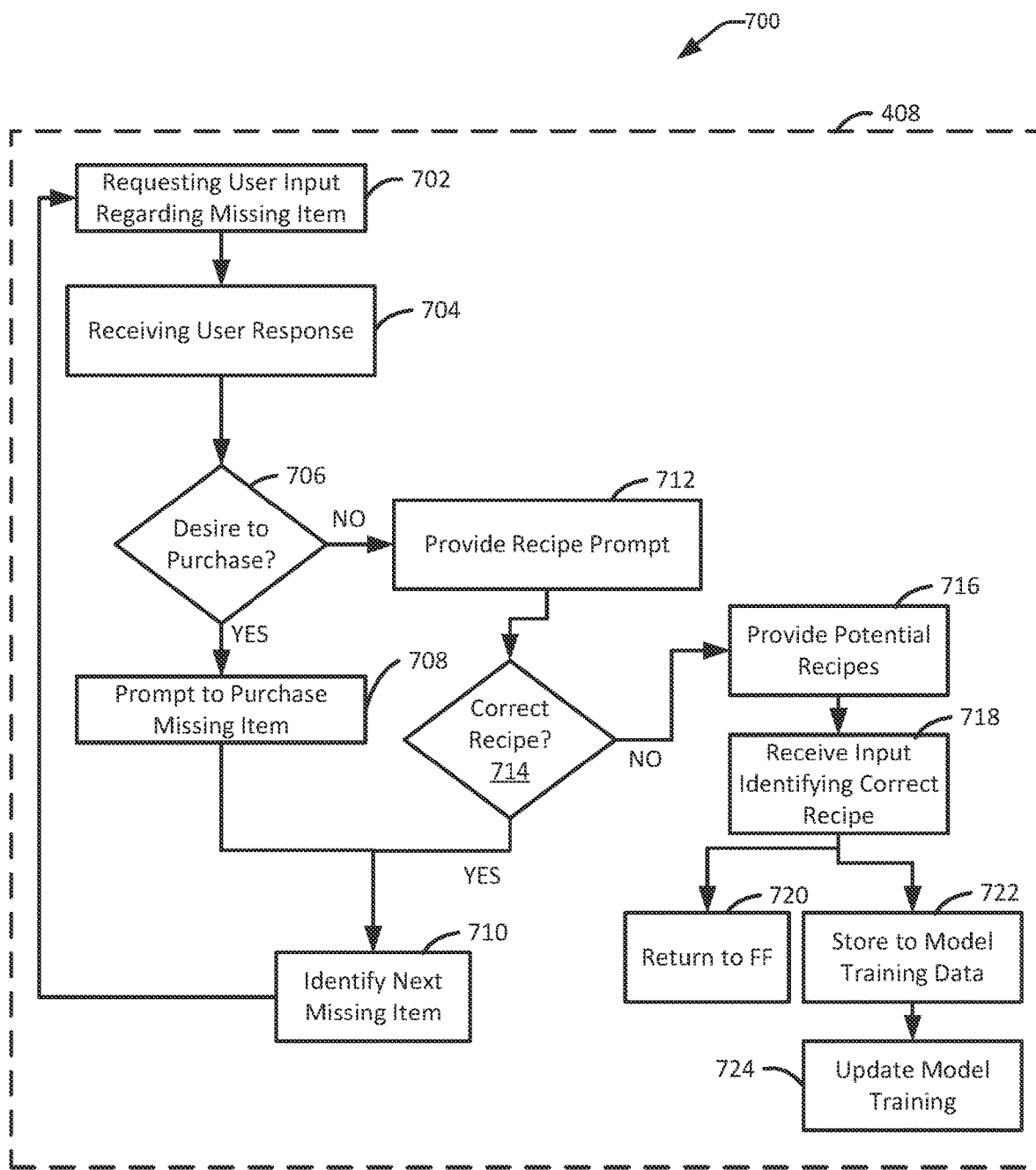
FIG. 7 is a flowchart illustrating one embodiment of a process for prompting a user to purchase a missing item.

With reference now to FIG. 7, a flowchart illustrating one embodiment of a process 700 for prompting a user to purchase a missing item is shown. The process 700 can be performed by the server 102. The process 700 can be performed as a part of, or in the place of step 408 of FIG. 4. The process 700 begins at block 702, wherein user input is requested by the server 102 regarding a potential missing item. This can include the sever 102 delivering a communication to the user device 116 requesting a user input regarding a potential missing item. In embodiments in which there are multiple potential missing items, then as a part of step 702, one of the potential missing items can be selected and user input regarding that missing item can be requested by the server 102, alternatively, user input regarding a plurality of missing items can be simultaneously requested by the server 102.

In some embodiments, this request for input can include a request for user input as to whether the user desires to purchase one or several of the missing items. In some embodiments, the user can be asked to identify which, if any, of the potential missing items that the user desires to purchase. In response to this request, a response can be received from the user device 116 by the server 102 as indicated in block 704. This response can be analyzed to determine, for some or all of the potentially missing items, if the user desires to purchase those one or several of the potentially missing items as indicated in decision step 706. The determination can be made by the server 102. If the user desires to purchase one or several of the potentially missing items, then the process 700 proceeds to block 708, wherein the user is prompted by the processor 102 to purchase those one or several potentially missing items that the user desires to purchase. In some embodiments, this can include the generation of a prompt by the server 102, which prompt can be send from the server 102 to the user device 116. Upon receipt of the prompt, the user device 116 can prompt the user to purchase those one or several missing items. In some embodiments, this can include recommending the purchase of the one or several missing items and/or displaying the one or several missing items in a shopping list.

At block 710, a next potentially missing item can be identified. In some embodiments, this next potentially missing item can be identified by the server 102. In some embodiments, the step of block 710 can include determining if there is at least one next potentially missing item, and if so, then identifying and/or selecting one of the at least one next potentially missing item. After this next potentially missing item has been identified, the process 700 can return to block 702, and can then proceed as outlined above. Alternatively, if there are no next potentially missing items, the process 700 can terminate and/or can continue to block 410 of process 400.

Returning again to block 706, if the user indicates a lack of desire to purchase one or more of the potentially missing items, then the process 700 can proceed to block 712, wherein a recipe prompt can be provided. The recipe prompt can be provided by the server 102 to the user device 116, and then from the user device 116 to the user. This recipe prompt can ask the user to indicate whether the identified recipe is correct, or in other words, if the user is making the identified recipe. A response to the recipe prompt can be received from the server 102 from the user device 116, and the server 102 can determine if the identified is correct as shown at decision state 714. If it is determined that the identified recipe is correct, and if input has not been requested for all of the potentially missing items, the process 700 can proceed to block 710, wherein a next potentially missing item is identified, after which the process 700 can return to block 702. The process 700 can then proceed as outlined above. Alternatively, if there are no next potentially missing items, the process 700 can terminate and/or can continue to block 410 of process 400.

If it is determined that the identified recipe is incorrect, which can include, in some embodiments, that the user is creating one or several recipes in addition to the identified recipe, then the process 700 proceeds to block 716, wherein one or several additional potential recipes are provided to the user device 116 by the server 102, which user device 116 can then provide the recipes to the user. At block 718, a user input is received by the server 102 from the user device, the user input identifying one or several correct recipes. In some embodiments, this can include the selection of one or several recipes provided in block 716 and/or the receipt of identification of a previously unprovided recipe. At block 720, the process proceeds to block 410, and proceeds as outlined above.

At block 722, the inputs identifying the correct recipe and features used in identifying the incorrect recipe are stored. In some embodiments, this information can be stored in the model database. This information stored in the model database 110 can be used as training data to update and/or retrain the model as indicated in block 724. In some embodiments, this retraining and/or updating of the model training can be performed when a sufficient amount of data identifying incorrect recipes and associated features has been stored in the model database 110 by the server 102.

Figure 8:
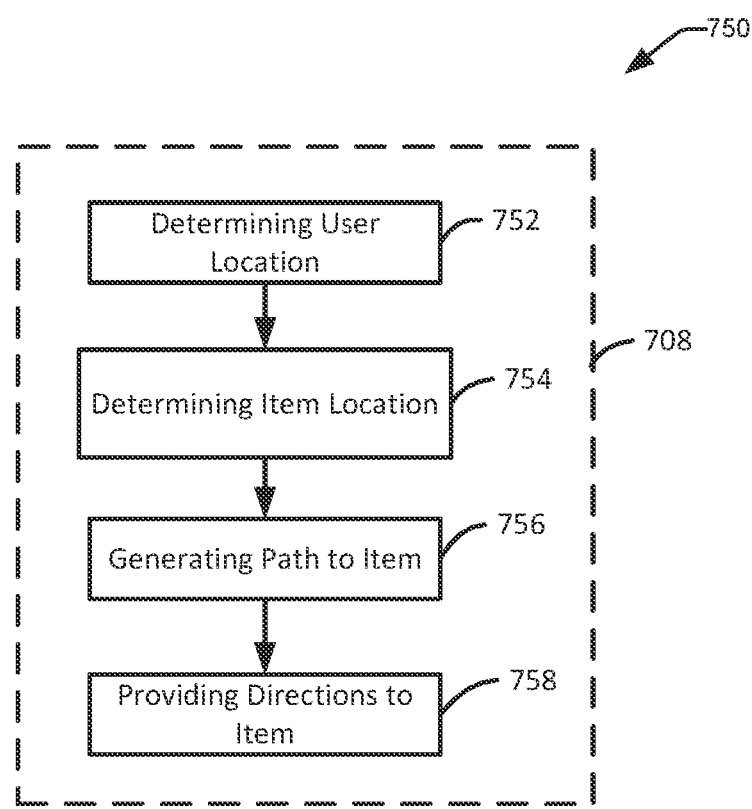
FIG. 8 is a flowchart illustrating one embodiment of a process for prompting a user to purchase a missing item.

With reference now to FIG. 8 a flowchart illustrating one embodiment of a process 750 for prompting a user to purchase a missing item is shown. In some embodiments, the process can be performed as a part of, or in the place of step 708 of process 700. The process 750 begins at block 752, wherein the user location is determined by the server 102. After the user location is determined, the location of the item is determined by the server 102 as indicated in block 754. The location of the item can be determined based on information from the inventory database 120.

At block 756 one or several paths to the item can be generated by the server 102. In some embodiments, the paths can be generated based on information received from the inventory database 120, which information can identify the layout of the retailer 114. In some embodiments, this information can include a map of the layout of the retailer 114, which map can be used to generate paths to the item. In some embodiments in which multiple paths are generated, the shortest path can be selected. At block 758, directions to the item can be provided by the server 102 to the user device 116, which user device 116 can then provide the directions to the user. These directions can, in some embodiments, be based on the selected path to the item.

Figure 9:
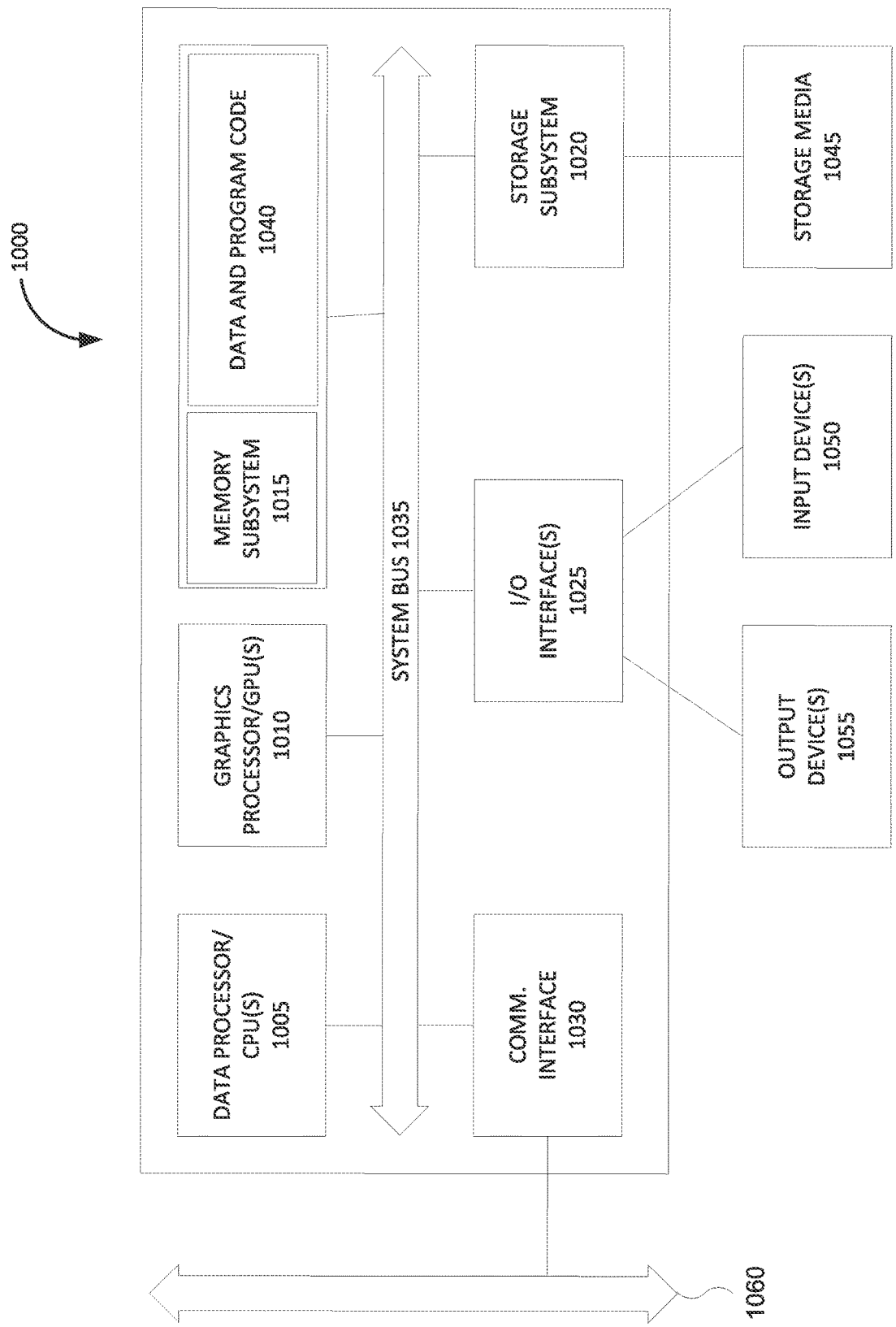
FIG. 9 is a block diagram of a computer system or information processing device that may incorporate an embodiment, be incorporated into an embodiment, or be used to practice any of the innovations, embodiments, and/or examples found within this disclosure.

FIG. 9 shows a block diagram of computer system 1000 that is an exemplary embodiment of the processor 102 and can be used to implement methods and processes disclosed herein. FIG. 9 is merely illustrative. Computer system 1000 may include familiar computer components, such as one or more one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like. Computer system 1000 can include system bus 1035 interconnecting the above components and providing functionality, such connectivity and inter-device communication.

The one or more data processors or central processing units (CPUs) 1005 execute program code to implement the processes described herein. The one or more graphics processor or graphical processing units (GPUs) 1010 execute logic or program code associated with graphics or for providing graphics-specific functionality. Memory subsystem 1015 can store information, e.g., using machine-readable articles, information storage devices, or computer-readable storage media. Storage subsystem 1020 can also store information using machine-readable articles, information storage devices, or computer-readable storage media. Storage subsystem 1020 may store information using storage media 1045 that can be any desired storage media.

The one or more input/output (I/O) interfaces 1025 can perform I/O operations and the one or more output devices 1055 can output information to one or more destinations for computer system 1000. One or more input devices 1050 and/or one or more output devices 1055 may be communicatively coupled to the one or more I/O interfaces 1025. The one or more input devices 1050 can receive information from one or more sources for computer system 1000. The one or more output devices 1055 may allow a user of computer system 1000 to view objects, icons, text, user interface widgets, or other user interface elements.

Communications interface 1030 can perform communications operations, including sending and receiving data. Communications interface 1030 may be coupled to communications network/external bus 1060, such as a computer network, a USB hub, or the like. A computer system can include a plurality of the same components or subsystems, e.g., connected together by communications interface 1030 or by an internal interface.

Computer system 1000 may also include one or more applications (e.g., software components or functions) to be executed by a processor to execute, perform, or otherwise implement techniques disclosed herein. These applications may be embodied as data and program code 1040. Such applications may also be encoded and transmitted using carrier signals adapted for transmission via wired, optical, and/or wireless networks conforming to a variety of protocols, including the Internet.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A non-transitory computer-readable media comprising computer-readable instructions stored thereon that when executed by one or more processors of an automated product recommendation system cause the one or more processors to perform a process comprising:
   receiving, from a mobile device of a user in a retail location, identification information associated with a physical article selected for purchase, and a unique identifier for the mobile device of the user;
   confirming, based on the identification information, that the physical article corresponds to a selected item in an inventory database;
   linking, based on the unique identifier, the user to a user account by:
      comparing the unique identifier of the mobile device to a plurality of alternate unique identifiers associated with a respective plurality of preexisting user accounts;
      creating the user account in response to determining that none of the plurality of preexisting user accounts are associated with the unique identifier or linking the user account to one of the plurality of preexisting user account in response to determining that the one of the plurality of preexisting user accounts is associated with the unique identifier;
   generating a first entry in a mirror-cart linked with the user account, the mirror-cart comprising entries corresponding to the physical article selected for purchase and any other physical articles selected for purchase, and the first entry comprising the selected item in the inventory database;
   identifying a recipe associated with the selected item, wherein the recipe identifies other items to be combined with the selected item to create a product, wherein identifying the recipe associated with the selected item comprises:
      generating features based on the selected item and zero or more items in the mirror-cart, wherein for generating the features, the selected item and the zero or more items in the mirror-cart are clustered into one or more groups, wherein each of the one or more groups comprises items of a particular type; and
      selecting the recipe based on an association with the generated features and the one or more groups;
   identifying a missing item, wherein the missing item is related to the recipe and is not contained in the mirror-cart;
   determining a location of the user;
   determining a location of the missing item in the retail location;
   providing directions for the user to the missing item; and
   transferring an invoice to a point of sale terminal at the retail location, the invoice including the missing item.

2. The non-transitory computer-readable media of claim 1, wherein the selected item comprises a food item, and wherein the product comprises a meal component.

3. The non-transitory computer-readable media of claim 1, wherein the computer-readable instructions further cause the one or more processors to receive payment confirmation for payment made at the point of sale terminal for the one or more items in the mirror-cart.

4. The non-transitory computer-readable media of claim 1, wherein to select the recipe based on the association with the generated features, the computer-readable instructions further cause the one or more processors to:
   ingest the generated features into a machine learning model trained to output a predicted recipe based on ingested features corresponding to items in the mirror-cart;
   receive the machine learning model output; and
   select the recipe having a strongest association with the generated features.

5. The non-transitory computer-readable media of claim 1, wherein the unique identifier comprises a telephone number or an International Mobile Equipment Identity (IMEI) number.

6. The non-transitory computer-readable media of claim 1, wherein the computer-readable instructions further cause the one or more processors to:
   prompt the user to purchase the missing item;
   generate a second entry in the mirror-cart comprising the missing item when the user selects the missing item for purchase; and
   update the invoice with price information for the missing item, wherein the invoice identifies a total price of one or more items included in the mirror-cart.

7. The non-transitory computer-readable media of claim 6, wherein to prompt the user to purchase the missing item, the computer-readable instructions further cause the one or more processors to:
   ingest the generated features into a machine learning model trained to output a predicted recipe based on ingested features corresponding to items in the mirror-cart;
   receive the machine learning model output;
   request a user input indicating whether the user desires to purchase the missing item;
   receive a response to the request for the user input; and
   update the training of the machine learning model based on the response to the request for the user input.

8. The non-transitory computer-readable media of claim 6, wherein to prompt the user to purchase the missing item, the computer-readable instructions further cause the one or more processors to:
   request a user input indicating whether the user desires to purchase the missing item; and
   receive a response to the request for the user input.

9. The non-transitory computer-readable media of claim 1, wherein the point of sale terminal is selected based at least on a detected location of the user or an amount of traffic at the point of sale terminal.

10. The non-transitory computer-readable media of claim 1, wherein to generate the features, the computer-readable instructions further cause the one or more processors to:
 determine that a plurality of the one or more groups has a relevance exceeding a relevance threshold; and
 use the plurality of the one or more groups which exceed the relevance threshold together to generate the features.

11. A system for automated product recommendation, the system comprising:
 one or more memories storing computer-readable instructions thereon; and
 one or more processors configured to execute the computer-readable instructions to:
 receive, from a mobile device of a user in a retail location, identification information associated with a physical article selected for purchase, and a unique identifier for the mobile device of the user;
 confirm, based on the identification information, that the physical article corresponds to a selected item in an inventory database;
 link, based on the unique identifier, the user to a user account by:
  comparing the unique identifier of the mobile device to a plurality of alternate unique identifiers associated with a respective plurality of preexisting user accounts;
  creating the user account in response to determining that none of the plurality of preexisting user accounts are associated with the unique identifier or linking the user account to one of the plurality of preexisting user account in response to determining that the one of the plurality of preexisting user accounts is associated with the unique identifier;
 generate a first entry in a mirror-cart linked with the user account, the mirror-cart comprising entries corresponding to the physical article selected for purchase and any other physical articles selected for purchase, and the first entry comprising the selected item in the inventory database;
 identify a recipe associated with the selected item, wherein the recipe identifies other items to be combined with the selected item to create a product, wherein the identification of the recipe associated with the selected item comprises:
  a generation of features based on the selected item and zero or more items in the mirror-cart, wherein to generate the features, the selected item and the zero or more items in the mirror-cart are clustered into one or more groups, wherein each of the one or more groups comprises items of a particular type; and
  a selection of the recipe based on the generated features and the one or more groups;
 identify a missing item, wherein the missing item is related to the recipe and is not contained in the mirror-cart;
 determine a location of the user;
 determine a location of the missing item in the retail location;
 provide directions for the user to the missing item;
 transfer an invoice to a point of sale terminal at the retail location.

12. The system of claim 11, wherein the selected item comprises a food item, and wherein the product comprises a meal component.

13. The system of claim 11, wherein the computer-readable instructions further cause the one or more processors to:
 receive payment confirmation for payment made at the point of sale terminal for the one or more items in the mirror-cart.

14. The system of claim 11, wherein to select the recipe based on the generated features, the computer-readable instructions further cause the one or more processors to:
 ingest the generated features into a machine learning model trained to output a predicted recipe based on ingested features corresponding to items in the mirror-cart; and
 receive the machine learning model output.

15. The system of claim 11, wherein the unique identifier comprises a telephone number or an International Mobile Equipment Identity (IMEI) number.

16. The system of claim 11, wherein, the computer-readable instructions further cause the one or more processors to:
 compare items identified in the recipe to the selected item and the zero or more items contained in the mirror-cart to identify a missing item, wherein the missing item is identified in the recipe and is not contained in the mirror-cart;
 prompt the user to purchase the missing item;
 generate a second entry in the mirror-cart comprising the missing item when the user selects the missing item for purchase; and
 update the invoice with price information for the missing item, wherein the invoice identifies a total price of one or more items included in the mirror-cart.

17. The system of claim 16, wherein to prompt the user to purchase the missing item, the computer-readable instructions further cause the one or more processors to:
 ingest the generated features into a machine learning model trained to output a predicted recipe based on ingested features corresponding to items in the mirror-cart;
 receive the machine learning model output;
 request a user input indicating whether the user desires to purchase the missing item;
 receiving a response to the request for the user input; and
 update the training of the machine learning model based on the response to the request for the user input.

18. The system of claim 16, wherein to prompt the user to purchase the missing item, the computer-readable instructions further cause the one or more processors to:
 request a user input indicating whether the user desires to purchase the missing item; and
 receive a response to the request for the user input.

19. The system of claim 11, wherein the computer-readable instructions further cause the one or more processors to:
 detect the location of the user;
 detect an amount of traffic at one or more point of sale locations; and
 select the location based on the location of the user and the amount of traffic.

20. The system of claim 11, wherein the computer-readable instructions further cause the one or more processors to:
 a plurality of the one or more groups is determined to have a relevance exceeding a relevance threshold, and the plurality of the one or more groups which exceed the relevance threshold is used together to generate the features.

\* \* \* \* \*